(No Model.)
J. ARBUCKLE.
SAFETY SIGNAL FOR RAILROAD TRAINS.
No. 262,722. Patented Aug. 15, 1882.
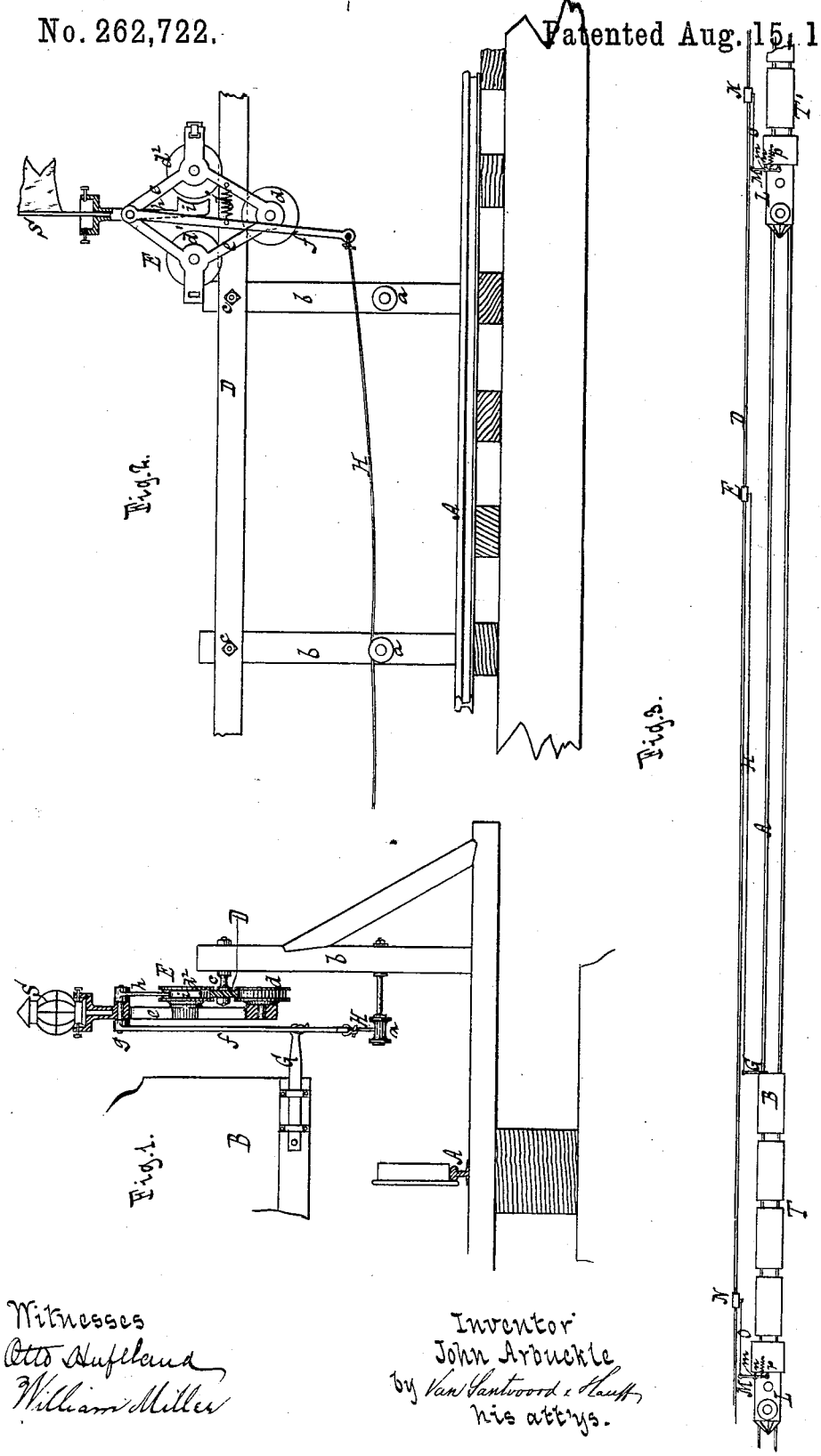
Witnesses
Otto Hufeland
William Miller
Inventor
John Arbuckle
by Van Santvoord & Hauff
his attys.

UNITED STATES PATENT OFFICE.

JOHN ARBUCKLE, OF BROOKLYN, NEW YORK.

SAFETY-SIGNAL FOR RAILROAD-TRAINS.

SPECIFICATION forming part of Letters Patent No. 262,722, dated August 15, 1882.

Application filed January 25, 1882. (No model.)

*To all whom it may concern:*

Be it known that I, JOHN ARBUCKLE, a citizen of the United States, residing at Brooklyn, in the county of Kings and State of New York, have invented new and useful Improvements in Safety-Signals for Railroad-Trains, of which the following is a specification.

This invention consists in the combination, with a railroad-track and with a car moving thereon, of a signal apparatus attached to the car on the track and moving at a distance behind said car; also, in certain specific devices employed in the construction of the signal apparatus, as fully pointed out in the annexed specification.

This invention is illustrated in the accompanying drawings, in which Figure 1 represents a transverse vertical section of a track and a car provided with my signal apparatus. Fig. 2 is a longitudinal vertical section of the same. Fig. 3 is a plan or top view of the same on a smaller scale than the previous figures.

Similar letters indicate corresponding parts.

In the drawings, the letter A designates the track, on which moves the car B. From the car extends an arm, G, to which is attached a small truck, E, by means of a rope or chain, H. The truck E runs on a secondary track, D, situated on the side and above the level of the main track A, and the rope or chain H is several hundred feet long, and it is supported by rollers $a$ $a$, which are fastened to the uprights $b$ $b$, supporting the secondary track D. On the truck E is secured the signal S, which in day-time consists of a flag and at night a lantern.

In the example shown in the drawings the secondary track consists of a single rail, which is fastened to the uprights $b$ $b$ by screw-studs $c$ $c$, and the truck E consists of three wheels, $d$ $d'$ $d^2$, which are grooved and mounted on studs secured in a frame, $e$, so that the wheel $d$ embraces the lower and the wheels $d'$ $d^2$ the upper edge of the track D. From the frame $e$ extends a lever, $f$, to the lower end of which is secured the rope or chain H, while its upper end is firmly secured on the inner end of a shaft, $g$, and on the outer end of this shaft is fastened a lever, $h$, which carries a brake-shoe, $i$. A spring, $j$, Fig. 2, has a tendency to draw this brake-shoe up against the wheel $d^2$; but when the car B is in motion and the rope or chain H is exposed to a certain strain the tension of the spring $j$ is overcome and the brake-shoe is drawn away from the wheel $d^2$, so as to allow the truck E to move freely on the track D.

It will be readily seen from this description that if the car moves forward on the main track A the truck E moves a certain distance behind it on the track D, and if the car A is stopped the truck E, with the signal S, stops at such a distance behind that a following train can be stopped, and the danger of running a train into another is avoided. At the same time the momentum of the truck E is taken up by the brake, which is applied as soon as the rope or chain H becomes slack at the moment the car stops.

In a train of cars the arm G is secured to the rear end of the last car in the train, and on the locomotive L is secured a lever, M, to which is secured a truck, N, by a short rope or chain, O. The truck N runs on the secondary track on the side of or close behind the locomotive. The lever M has its fulcrum on a pivot, $m$, secured in a fixed standard, $n$, and the rear end of said lever connects with a valve which may control an alarm, or which may be arranged to control the air-brakes. A spring, $p$, acts on the lever M so as to close said valve, and the tension of the rope or chain O, when the train is in motion, is not sufficient to overcome the tension of the spring $p$. When the train T (see Fig. 3) stops on the track A, and the following train T' approaches so that the truck N on the last-named train T' comes in contact with the truck E of the train T, the strain on the rope or chain O is increased, the tension of the spring $p$ is overcome, and the valve is opened, so as to sound the alarm or to apply the air-brakes. By this arrangement the second train is stopped, even if the engineer should fail to notice the signal carried by the truck E of the forward train.

Instead of the alarm being given by opening the valve, the truck N may be provided with a torpedo, which is exploded when the same strikes the truck E.

The rollers $a$ $a$ may be dispensed with, and a number of trucks E may support the rope at certain distances.

The secondary track D may be supplied with switches, so that the signal apparatus may be switched off when the train is switched off, and may be elevated also at sufficient height above the main track to allow the signal-truck to pass over the other tracks; also, in rounding curves, in addition to the horizontal rollers, vertical rollers may be applied alongside the horizontal rollers, so as to make it impossible for the rope or chain to get off the rollers.

The truck N may also serve to shut off the steam when it strikes the truck E of the train ahead.

What I claim as new, and desire to secure by Letters Patent, is—

1. The combination, with a railroad-track and with a car moving thereon, of a signal apparatus attached to the car on the track and moving at a distance behind said car.

2. The combination, substantially as hereinbefore described, of the main track A, the secondary track D, the truck E, moving on the secondary track, the rope or chain H, connecting said truck to the car on the main track, and the signal secured to the truck E.

3. The combination, substantially as hereinbefore described, of the main track A, the secondary track D, the truck E, moving on the secondary track, the rope or chain connecting said truck to the car on the main track, the signal secured to the truck E, and the brake for arresting the motion of the truck when the car stops.

4. The combination, substantially as hereinbefore described, of the main track A, the secondary track D, the truck E, moving on the secondary track at a distance behind the last car of a train on the main track, and the truck N, attached to the locomotive of a following train.

In testimony whereof I have hereunto set my hand and seal in the presence of two subscribing witnesses.

JOHN ARBUCKLE. [L. S.]

Witnesses:
  W. HAUFF,
  E. F. KASTENHUBER.